United States Patent [19]

McDaniel et al.

[11] 4,151,122
[45] Apr. 24, 1979

[54] REDUCTION AND REOXIDATION OF COGEL OR SELF-REDUCED CATALYST

[75] Inventors: Max P. McDaniel; Melvin B. Welch, both of Bartlesville, Okla.

[73] Assignee: Phillips Petroleum Company, Bartlesville, Okla.

[21] Appl. No.: 857,553

[22] Filed: Dec. 5, 1977

[51] Int. Cl.$^2$ .................... B01J 29/00; B01J 37/02
[52] U.S. Cl. .................................. 252/458; 252/452
[58] Field of Search ............................. 252/452, 458

[56] References Cited

U.S. PATENT DOCUMENTS

| | | | |
|---|---|---|---|
| 2,783,134 | 2/1957 | Hughes et al. | 252/458 X |
| 3,412,040 | 11/1968 | Saccardo et al. | 252/458 X |
| 3,446,754 | 5/1969 | Solvik et al. | 252/458 |
| 3,887,494 | 6/1975 | Dietz | 252/458 X |
| 4,053,436 | 10/1977 | Hogan et al. | 252/452 |

*Primary Examiner*—Carl Dees

[57] ABSTRACT

High melt flow olefin polymers suitable for such applications as injection molding, and the like requiring a narrow molecular weight distribution are produced using a catalyst made by reducing and reoxidizing a chromium catalyst on either a titanium-silica cogel or a self-reduced silica-containing composition. In the first embodiment, a cogel formed by coprecipitating silica and titania, and containing a chromium compound, is treated in a nonoxidizing atmosphere, such as CO, hydrogen, $N_2$ or a material decomposable to these materials, and thereafter reoxidized. In the second embodiment, a titanium-free chromium containing catalyst is first heated in air or the like to dry the catalyst and oxidize the chromium after which it is heated in an inert atmosphere wherein the composition is self-reduced to give chromium in a lower valence state. The resulting self-reduced composition is then heated in a reducing ambient and then reoxidized as in the first embodiment.

31 Claims, 1 Drawing Figure

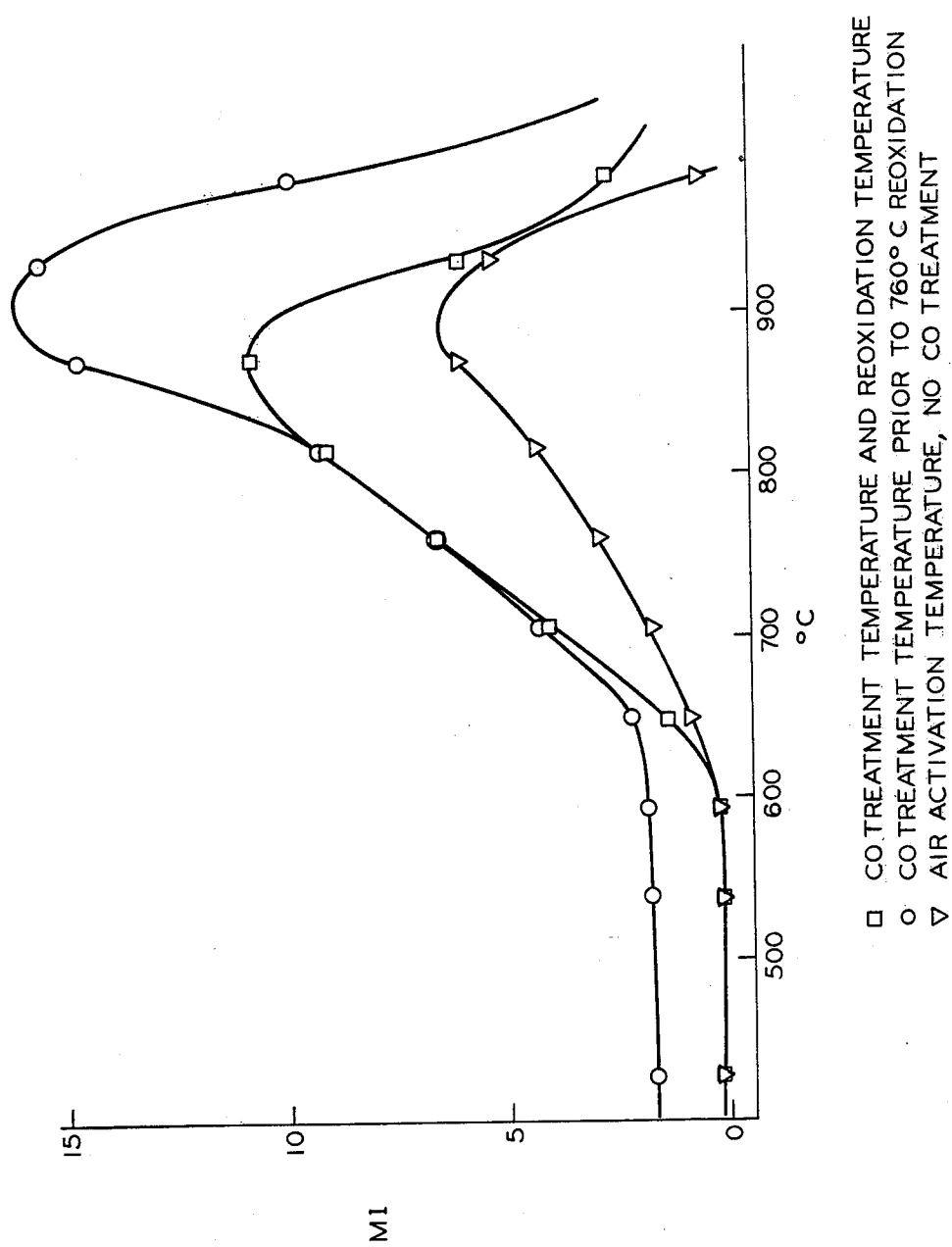

REDUCTION AND REOXIDATION OF COGEL OR SELF-REDUCED CATALYST

BACKGROUND OF THE INVENTION

This invention relates to the activation of chromium-containing olefin polymerization catalysts.

Supported chromium oxide catalysts can be used to prepare olefin polymers in a hydrocarbon solution to give a product having excellent characteristics from many standpoints. Supported chromium oxide catalysts can be used to prepare olefin polymers in a slurry system wherein the polymer is produced in the form of small particles of solid material suspended in a diluent. This process, frequently referred to as a particle-form process, has the advantage of being less complex. However, certain control operations which are easily carried out in the solution process are considerably more difficult in the particle-form process. For instance, in the solution process, control of the molecular weight can be effected by changing the temperature with lower molecular weight (higher melt flow) being obtained at the higher temperatures. However, in the slurry process, this technique is inherently limited since any effort to increase the melt flow to any appreciable extent by increasing temperature would cause the polymer to go into solution and thus destroy this slurry or particle-form process.

It is known in the art to utilize various techniques for altering the catalyst so as to give higher melt flow polymers but these techniques can cause a broadening in the molecular weight distribution. This is undesirable because many uses of high melt flow polymers, such as high speed extrusion and injection molding, require a narrow molecular weight distribution. For instance, in Hoff et al, U.S. Pat. No. 4,041,224 Aug. 9, 1977), it is disclosed to produce higher melt flow polymer by impregnating a titanium compound onto a chromium-containing catalyst, heating in an inert or reducing medium and thereafter reoxidizing. However, this technique is indicated to be ineffective for titanium-free catalyst systems and the presence of impregnated titanium, while not mentioned by the patent, results in a broad molecular weight distribution.

SUMMARY OF THE INVENTION

It is an object of this invention to provide a catalyst capable of giving high melt flow narrow molecular weight distribution polymer; it is a further object of this invention to provide a catalyst suitable for use in slurry polymerizaton systems; it is a further object of this invention to provide an improved method of activating a chromium-containing catalyst; it is yet a further object of this invention to provide a catalyst capable of giving high activity in addition to high melt flow and narrow molecular weight distribution; and it is still yet a further object of this invention to provide a catalyst capable of giving polymer suitable for injection molding and other applications requiring high melt flow and narrow molecular weight distribution.

In accordance with this invention, a chromium catalyst on a silica-titania cogel or a self-reduced chromium catalyst on a silica-containing base is reduced and reoxidized.

BRIEF DESCRIPTION OF THE DRAWING

The drawing, forming a part hereof, shows the relationship between melt index potential and activation procedure.

DESCRIPTION OF THE PREFERRED EMBODIMENTS

There are two embodiments in this invention. In the first, a silica-titanium cogel is subjected to a two-step process. In the second, a silica is subjected to a prior oxidation and self-reduction step (step 1) followed by a reducing step (step 2) which is analogous to step 1 of the first embodiment except that the ambient is specifically a reducing ambient whereas step 1 of the first embodiment can utilize either a reducing or an inert ambient. Step 2 of the first embodiment and step 3 of the second embodiment are similar. These two embodiments are illustrated hereinbelow in schematic form.

| | First Embodiment | |
|---|---|---|
| Step: | 1 | 2 |
| | Cogel (inert or reducing) | Reoxidation |

| | Second Embodiment | | |
|---|---|---|---|
| Step: | 1 | 2 | 3 |
| Ti-Free Silica or Cogel | Oxidize | Self-Reduce (Inert) | Reducing | Reoxidation |

In the first embodiment of this invention, the chromium-containing catalyst is a cogel, that is, a catalyst produced by coprecipitating silica and a titanium-containing compound. Production of such cogels is disclosed in Dietz, U.S. Pat. No. 3,887,494 (June 3, 1975), the disclosure which is hereby incorporated by reference. Cogels can be formed for instance by adding a titanium compound to a mineral acid, introducing an alkali metal silicate into the acid containing said titanium compound to form a hydrogel, aging the hydrogel for a time of greater than one hour, washing the thus aged hydrogel to produce a substantially alkali metal free hydrogel, forming a mixture comprising the thus washed hydrogel and a normally liquid oxygen-containing water soluble organic compound, and separating said organic compound and water from said mixture to form a xerogel. The catalyst contains chromium in an amount generally within the range of about 0.001 to 10, preferably 0.1 to 5, more preferably about 1 weight percent based on the weight of the cogel, i.e. the dried silica-titanium base (xerogel). The chromium compound can be incorporated as known in the art. For instance, a hydrocarbon solution of a material such as a tertiary butyl chromate can be used to impregnate the xerogel or an aqueous solution of a chromium compound such as chromium trioxide or chromium acetate can be added to the hydrogel before drying or chromium can be coprecipitated along with the silica and titanium. Anhydrous hydrocarbon solutions of $\pi$-bonded organochromium compounds such as diarene chromium compounds or biscyclopentadienyl chromium(II) can be used. In U.S. Pat. No. 3,976,632 (Dec. 4, 1974), U.S. Pat. No. 3,349,067 (Oct. 24, 1967), and U.S. Pat. No. 3,709,853 (Jan. 9, 1973), the disclosures of which are hereby incorporated by reference are disclosure of suitable chromium compounds.

The first embodiment is described in more detail as follows. The dry silica-titania cogel is preferably fluidized and heated to an elevated temperature and contacted with the nonoxidizing ambient after which it is reoxidized in an ambient containing about 10–100% oxygen. The nonoxidizing ambient is preferably carbon monoxide (CO) or a mixture of carbon monoxide and nitrogen ($N_2$). About 2–100% carbon monoxide and 98–0% nitrogen, for instance, can be utilized. About the same results are obtained with from 5–100% carbon monoxide (gas percentages are all in volume percent). Other nonoxidizing ambients include inert ambients such as carbon dioxide ($CO_2$), vacuum, helium and nitrogen, and reducing ambients in addition to CO such as hydrogen ($H_2$) and materials decomposable to CO and/or $H_2$ such as hydrocarbons, alcohols, ammonia and carboxylic acids.

Suitable hydrocarbons include methane, benzene, and the like which decompose into C and $H_2$.

Suitable alcohols for this purpose include saturated and unsaturated aliphatic and aromatic alcohols with boiling points of about 300° C. or less as a matter of convenience. Particularly preferred alcohols from an economic standpoint and ready availability are methanol and isopropanol. These can decompose into $H_2$ and CO.

Suitable carboxylic acids for this purpose include saturated and unsaturated compounds which are normally liquid as a matter of convenience. A fatty acid, particularly acetic acid, is presently preferred because of ready availability and low cost. These decompose into various mixtures of CO, $CO_2$, C and $H_2$.

The cogel base for this chromium compound is broadly referred to as a silica cogel although it can contain 0.1 to 20% of other materials, such as alumina, as is well known in the art. The only limitation being that it not contain titanium incorporated by impregnation. The titanium is present in the cogel in an amount within the range of 0.1 to 10, preferably 0.5 to 5 weight percent titanium based on the weight of the dried cogel (xerogel).

The catalyst can be heated to the temperature at which it is treated in the nonoxidizing ambient in either of three ways. First, it can be raised to that temperature in carbon monoxide or one of the other reducing ambients. Second, it can be raised to the appropriate temperature in air, the air quickly removed so as to avoid self-reduction in the inert ambient used to remove the air, and the reducing ambient such as carbon monoxide then introduced. Third, if the chromium is in the +3 valence state, it can be raised to the appropriate temperature in an inert atmosphere such as nitrogen. In the second method of raising the material to the temperature for treatment with the nonoxidizing ambient, the reason for avoiding nitrogen or some other inert ambient is to avoid self-reduction. If there is a substantial time utilized for flushing the air out with nitrogen in the second method, then there would be time for self-reduction to occur. Similarly, in the third method if the chromium is in the +6 state, self-reduction would occur on heating if an inert ambient, such as nitrogen, were used. Such procedures are not necessarily harmful and indeed they are frequently preferred as the data in the examples will show. However, such procedures would put the operation within the scope of the second embodiment rather than the first embodiment. With the first embodiment utilizing cogel, the self-reduction step can be eliminated and still obtain an excellent product.

In the second embodiment, the catalyst is either a titanium-free silica or a cogel. Again as is well known in the art, the base can contain 0.1 to 20% of other materials, such as alumina.

The first step of oxidation and self-reduction is referred to as a single step even though it actually involves two substeps for the reason that the initial oxidation may well occur when the catalyst is initially prepared which may be some time before it is actually used. Such a catalyst, which has been oxidized in the final step in its initial preparation, can then be subjected to the self-reduction step without any further treatment or it can be treated in air ambient a high temperatures to dry and oxidize same immediately prior to the self-reduction. It is also possible to utilize as a starting material a silica base having a chromium compound thereon which is in the +3 valence state and which is oxidized and subjected to the self-reduction.

The ambient for the self-reduction step of the second embodiment is coextensive with the inert nonoxidizing ambients of step 1 of the first embodiment. Nitrogen is the preferred material but vacuum, helium and the like can also be utilized. The reducing ambient for step 2 of the second embodiment is coextensive with the reducing ambients of the nonoxidizing treatment of step 1 of the first embodiment. The preferred material is carbon monoxide and mixtures of carbon monoxide and nitrogen as disclosed hereinabove with respect to the first embodiment. However, hydrogen and other materials decomposable into reducing agents described hereinabove as reducing agents in the first embodiment can also be used herein.

As to the third step, reoxidation, this is carried out in an identical or essentially identical manner to the reoxidation (step 2) for the first embodiment, air being the preferred ambient. With both embodiments, other oxidizing ambients such as nitrous oxide ($N_2O$), nitrogen dioxide ($NO_2$) nitric oxide (NO), oxygen-containing halogen compounds such as iodine pentoxide ($I_2O_5$) or chlorine monoxide ($Cl_2O$) and other materials which release oxygen can be used.

The temperature for the reduction step of the first embodiment will be at least 600° C. and generally in the range of 650–1100° C., preferably 700–925° C. Temperatures of 760°–925° C. are particularly suitable for carbon monoxide and carbon monoxide/nitrogen mixtures. Times for these treatments can be at least 5 minutes, preferably a half hour to 24 hours, more preferably 2 to 7 hours.

The reoxidation temperatures are from 450°–1000° C., preferably 500°–925° C., more preferably 590°–800° C. The time for the reoxidation step is at least 5 minutes, preferably one-half to 10 hours, more preferably 1 to 4 hours. Of course, the times and temperatures can be influenced by the percent of oxygen in the reoxidation ambient with a temperature of about 650°–800° C. being especially preferred when utilizing air reoxidation of a carbon monoxide reduced material.

As to the second embodiment, there is substantial leeway in the manner of effecting the first part of step 1, that is, the initial oxidation. As is noted hereinabove, the material may be oxidized during the final step of its formation and thus is ready to immediately go into the second part of step 1, the self-reduction. Or the chromium may be in a lower valence state, generally, the valence state of +3 in which case it can be simply heated in air for a time sufficient to convert at least a majority of the chromium into the form of chromium trioxide ($CrO_3$). Alternatively $CrO_3$ can simply be added to the base to give a material already in the proper form for the self-reduction portion of step 1. Thus, the heating temperature will generally start at room temperature and by the time the material is heated to about 650° C. sufficient oxidation will have taken place. This heating step will take at least 5 minutes, preferably 30 minutes to 24 hours, more preferably from 2 to 7 hours. Alternatively, the heating can be stopped at some set temperature between 250° C. and 1000° C. and held at that temperature in the presence of an oxygen-containing ambient for the times recited above. As with the reoxidation treatment, ambients containing about 10–100% oxygen, the remainder being an inert material such as nitrogen can be used. However, for convenience, air is the preferred ambient. After the temperature reaches a point within the range of 250°–1000° C., preferably about 650° C., the oxidizing ambient is discontinued and the inert ambient is begun. Even when the catalyst is originally formed using $CrO_3$, it is preferred to heat up to self-reduction temperature in air so as to avoid high temperature contact of the chromium with moisture in an inert atmosphere.

The self-reduction portion of step 1 of the second embodiment is carried out at a temperature within the range of 600°–1100° C., preferably 700°–925° C. This treatment can simply be carried out during the time required to heat from the initial temperature to the final temperature or the temperature can be held at any point within the above disclosed range. In any event, the total heating time will be at least 5 minutes and will generally be within the range of 5 minutes to 15 hours, preferably 20 minutes to 10 hours, more preferably 40 minutes to 3 hours. Reducing step 2 is carried out for the same times and at the same temperatures set out hereinabove with respect to step 1 of the first embodiment. It is again pointed out that in step 2 of the second embodiment, the ambient is changed from the inert ambient of the second part of step 1 to an ambient which is reducing under the conditions used, that is, the carbon monoxide or hydrocarbons as disclosed hereinabove. The final reoxidation is carried out for the same times and temperatures given hereinabove with respect to reoxidation step 2 of the first embodiment. In both embodiments where high melt index is the overriding consideration, the reoxidation step is preferably carried out at a temperature of at least 100° C. below the temperature used for the reduction step.

If desired, the catalyst of this invention can be activated in a continuous activator. For instance, catalyst can be introduced at the top of a compartmentalized vertical activator with the first gas to be used in treating the catalyst being introduced at the bottom of the first (upper) compartment and taken off near the top thereof. The second gas is introduced near the bottom of the second (lower) compartment and taken off near the top thereof and if three or more gases are used, the process can continue in a like manner. In each compartment, the catalyst would be fluidized with the treating medium. Alternatively, two or more compartments could be utilized with the same gaseous treating medium, if desired, to increase residence time. An external furnace can heat each compartment to the desired temperature. While a continuous activator was not used to produce the catalysts of the examples set out hereinbelow, the use of a continuous activator was simulated by introducing the catalyst initially into an activator which was at an elevated temperature. It was found that in the embodiments wherein the initial heating is done in a nonoxidizing atmosphere, problems sometimes associated with introducing catalysts in the presence of air into an already heated activator were not encountered.

The catalysts of this invention can be used to polymerize at least one mono-1-olefin containing 2 to 8 carbon atoms per molecule. The invention is of particular applicability in producing ethylene homopolymers and copolymers from mixtures of ethylene and 1 or more comonomers selected from 1-olefins containing 3 to 8 carbon atoms per molecule. Exemplary comonomers include aliphatic 1-olefins, such as propylene, 1-butene, 1-hexene, and the like and conjugated or nonconjugated diolefins, such as 1,3-butadiene, isoprene, piperylene, 2,3-dimethyl-1,3-butadiene, 1,4-pentadiene, 1,7-hexadiene, and the like and mixtures thereof. Ethylene copolymers preferably constitute at least about 90, preferably 95 to 99 mole percent polymerized ethylene units. Ethylene, propylene, 1-butene and 1-hexene are especially preferred.

The polymers can be prepared from the activated catalysts of this invention by solution polymerization, slurry polymerization, and gas phase polymerization techniques using conventional equipment and contacting processes. However, the catalysts of this invention are particularly suitable in slurry polymerizations for the production of high melt index (MI) polymers, i.e. polymers having MI values in the 8 to 35 range and above in the absence of molecular weight modifiers, such as hydrogen, and molecular weight distribution values sufficiently narrow to be of commercial interest for applications such as injection molding. The slurry process is generally carried out in an inert diluent such as a paraffin, aromatic or cycloparaffin hydrocarbon. For predominantly ethylene polymers, a temperature of about 66°–110° C. is employed. For example, ethylene homopolymers exhibiting a melt index in the 5 to 35 range can be obtained by contact with the catalyst of this invention, whereas otherwise identical catalyst conventionally activated yield 5 to 6 MI polymers at the same 110° C. reactor temperature. At lower reactor temperatures, both the invention and control catalysts give lower MI and higher HLMI/MI ratios so the comparisons must be at the same reactor temperature. The high MI polymers have HLMI/MI ratio values ranging from about 33 to 38 with $M_w/M_n$ values of about 4 at the 110° C. reactor temperature. Such resins can be injection molded in conventional apparatus to form tough, low warpage articles.

The figure shows the relationship between melt index potential and activation procedure. In each instance, the catalyst is a titanium-silica cogel. The figure is a bit unusual in that the temperature numbers on the abscissa represent something different for each of the three curves. In the bottom curve, represented by the triangles, the numbers represent the air activation temperature of the catalyst, which catalyst has received no other type of treatment, that is, simply a control catalyst. Note that this is a cogel catalyst, which represents the best system of the prior art with these type of catalysts for achieving high melt flow. The curve represented by the squares depicts the melt index-temperature relationship for polymer produced with catalysts of this invention wherein the temperature numbers on the abscissa represent the temperature at which the CO treatment was carried out and also the temperature at which the air reoxidation was carried out, that is, the temperature was left the same after the CO treatment for the reoxidation treatment. Since the optimum temperature for reoxidation is not the same as the optimum temperature for the carbon monoxide treatment, it can be seen that the melt indexes achieved are not as high as those achieved in the third curve. However, they are substantially higher than that of the control showing that the treatment in the non-oxidizing atmosphere and the subsequent reoxidation can be carried out at the same temperature. The temperature numbers on the abscissa for the third curve represented by the circles is the carbon monoxide treatment temperature utilized prior to a 760° C. reoxidation. As can be seen, extremely high melt index values are achieved using carbon monoxide treating temperatures within the preferred range of 760°–925° C. and air reoxidation temperatures within the preferred range of 550°–800° C. The data in the figure were obtained in runs at 110° C.

The catalysts of this invention can be used with conventional cocatalysts if desired. Also hydrogen can be used to further increase the MI if desired.

EXAMPLE I

A series of catalysts was prepared from a silica-titania cogel containing 2 weight percent titanium in the form of titanium oxide and 1 weight percent chromium in the form of chromium acetate. The silica-titania cogel was prepared by coprecipitation, aged, washed, impregnated with an aqueous solution of chromium acetate and dried by azeotrope distillation with ethyl acetate. The catalysts were activated in 48 mm O.D. quartz tubes using a heat-up rate of 3°–5° C. per minute and a gas flow of about 40 liters per hour. This gas flow corresponds to a superficial linear velocity at 1600° F. (871° C.) of 0.1 ft/sec (0.03 m/sec). Generally, 30–80 ml of catalyst was charged during each activation and each catalyst was activated under fluid bed conditions.

Each activated catalyst was tested for melt index capability by polymerizing ethylene in a particle form process in a 2 or 3 liter stainless steel reactor with isobutane as the diluent at 550 psig (3.89 MPa g) to give yields of about 5000 g polymer per gram catalyst. Reactor temperature employed was 110° C. in all instances. Melt index values, determined according ASTM D 1238-62T, condition E (g/10 min), are adjusted slightly to a productivity value of 5000 g polyethylene/g catalyst based on correlations between MI and productivity. High load melt index (HLMI) is determined according to ASTM D 1238-65T, condition F(g/10 min). The ratio, HLMI/MI, gives a measure of the molecular weight distribution $M_w/M_n$ of the polymer, the smaller the number the narrower the distribution. That is, if the molecules were all of the same length, the weight average molecular weight ($M_w$) would be the same as the number average molecular weight ($M_n$) and the ratio would be 1. However, as a practical matter, there are always some short molecules and some longer ones. Since the longer molecules exercise a disproportionate effect on the properties of the polymer, a molecular weight average simply based on adding up the molecular weight of all of the molecules and dividing by the number of molecules ($M_n$) would not give a true picture of the situation, hence the use of the weight average molecular weight. However, the ratio of $M_w/M_n$ also affects polymer properties with polymers having a narrower distribution (lower $M_w/M_n$ or lower HLMI/MI ratio) being better suited for uses such as high speed extrusion cooling and injection molding. The activation conditions used and results obtained are given in Table I to illustrate embodiment 1 of the invention.

Table 1

| | Catalyst Activation In Non-Oxygen Ambient Followed By Air Oxidation | | | | | |
|---|---|---|---|---|---|---|
| Run No. | Activation Procedure | MI (g/10 min) | HLMI/MI | Run Time (Min) | Productivity (g/g catalyst) | Remarks |
| 1 | Heat in air to 871° C., hold 5 hrs. | 5.2 | 37.9 | 58 | 4970 | conventional activation, control |
| 2 | Heat in CO to 871° C., hold 3 hrs., then 2 hrs. in air at 871° C. | 10.8 | 35.8 | 59 | 5740 | invention |
| 3 | Heat in CO to 871° C., hold 3 hrs., then 2 hrs. in air at 705° C. | 20.7 | 42.7 | 80 | 5150 | invention |
| 4 | Heat in $N_2$ to 871° C., hold 5 hrs., then 2 hrs. in air at 600° C. | 17.0 | 37.5 | 100 | 4400 | invention |
| 5 | Heat in $N_2$ to 871° C., hold 5 hrs., then 2 hrs. in air at 705° C. | 12.0 | 37.5 | 60 | 5250 | invention |
| 6 | Heat in $N_2$ to 871° C., hold 6 hrs., then 2 hrs. in air at 760° C. | 11.6 | 37.9 | 80 | 5210 | invention[1] |
| 7 | Heat in $N_2$ to 871° C., $\frac{30}{70}$ $\frac{air}{N_2}$ for 3 hrs. at 871° C., $N_2$ for 2 hrs. at 871° C., air for 2 hrs. at 650° C. | 6.3 | 40.0 | 84 | 5830 | invention[2] |

Notes:
[1]Cogel impregnated with n-hexanol.
[2]Cogel impregnated with 30 weight percent Tween 20 (polyoxyethylene (20) sorbitan monolaurate) a product of Atlas Chemical Industries, Inc.

The results show the melt index potential of silica-titania-chromium oxide catalysts activated in this invention can be increased from about 1.2 to 4 times compared to conventional air activation, run 1, by first heating the catalysts in a non-oxygen gaseous ambient such as carbon monoxide, nitrogen and vapors of certain oxygen-containing organic compounds and then oxidizing the products at the same or lower temperature in air. Based on the MI of polyethylene made over the catalysts, it can be seen that an initial heat treatment in carbon monoxide is more effective than in the other mediums tested. Comparing runs 2 and 3, and 4 and 5, it is evident that when the initial heat treatment is conducted in either carbon monoxide or nitrogen at about 870° C., the subsequent oxidation treatment is preferably conducted below about 870° C. to further improve the melt index capability of the catalysts. Runs 6 and 7 show that catalysts containing minor amounts of oxygen-containing organic compounds such as esters, nonionic surfactants, etc., when based in a non-oxidizing atmosphere and then reoxidized in air improve the melt index capability of the catalysts.

The catalyst activation conditions employed and polymerization results obtained are given in Table 2.

Table 2

| | Catalyst Activation By Preoxidation Reduction and Reoxidation | | | | | | | | | |
|---|---|---|---|---|---|---|---|---|---|---|
| | Temperature Rise | | | | | | Run | | | |
| Run No. | Air to | CO to | N₂ to | CO °C./hrs. | Air °C./hrs. | MI (g/10 min) | HLMI/MI | Time (Min) | Productivity (g/g catalyst) | Catalyst Base | Remarks |
| 1 | 871° C. | na[1] | na | na | 760/2 | 5.5 | 40.0 | 106 | 5700 | silica-titania cogel | conventional activation, control |
| 2 | na | 871° C. | na | 871/3.0 | 760/2 | 14.7 | 37.5 | 84 | 5130 | silica-titania cogel | invention (embodiment 1) |
| 3 | 643° C. | na | 871° C. | 871/0.5 | 760/2 | 10.0 | 37.1 | 62 | 5290 | silica-titania cogel | invention (embodiment 2)[2] |
| 4 | 621° C. | na | 871° C. | 871/1.5 | 760/2 | 17.4 | 33.6 | 76 | 4730 | silica-titania cogel | invention (embodiment 2) |
| 5 | 649° C. | na | 871° C. | 871/3.0 | 760/2 | 19.9 | 44.0 | 65 | 4050 | silica-titania cogel | invention (embodiment 2) |
| 6 | 638° C. | na | 871° C. | 871/6.5 | 760/2 | 22.8 | 39.3 | 65 | 5180 | silica-titania cogel | invention (embodiment 2) |
| 7 | 816° C. | na | na | na | 816/5.5 | 2.4 | 46.0 | 58 | 5470 | Ti-free silica | conventional activation, control |
| 8 | na | 871° C. | 871° C. | 871/3.0 | 760/2 | 3.3 | 45.3 | 66 | 5530 | Ti-free silica | control |
| 9 | na | na | 871° C. | 871/3.0 | 760/2 | 3.4 | 42.6 | 110 | 6240 | Ti-free silica | control[3] |
| 10 | 538° C. | na | 871° C. | 871/4.5 | 816/0.5 | 5.9 | 46.0 | 50 | 4980 | Ti-free silica | invention (embodiment 2) |
| 11 | 538° C. | na | 871° C. | 871/4.5 | 760/0.5 | 6.8 | 45.0 | 110 | 5250 | Ti-free silica | invention (embodiment 2) |
| 12 | 649° C. | na | 871° C. | 871/4.5 | 760/0.5 | 7.1 | 42.0 | 70 | 4830 | Ti-free silica | invention (embodiment 2) |
| 13 | 760° C. | na | na | na | 760/5.5 | 1.1 | 41.0 | 100 | 5700 | exper. silica (Ti-free) | conventional activation, control |
| 14 | na | na | 871° C. | 871/3.0 | 760/2.0 | 4.0 | 44.0 | 87 | 5590 | exper. silica (Ti-free) | control |
| 15 | 649° C. | na | 1871° C. | 871/3.0 | 760/2.0 | 6.8 | 36.0 | 70 | 3870 | exper. silica (Ti-free) | invention (embodiment 2) |

Notes:
[1]Not applicable.
[2]As previously set out, embodiment 2 can be used with either coprecipitated titanium or titanium-free silica catalysts.
[3]Titanium-free catalysts require embodiment 2 using the preoxidation and self-reduction.

EXAMPLE 2

A series of catalysts prepared from a silica-titania composite (cogel) containing chromium acetate formed and dried as described in Example 1 was activated according to embodiments 1 and 2 previously described, Another series of catalysts was prepared from a sample of silica containing 2 weight percent $CrO_3$ (1 weight percent chromium) calculated on a dry basis of support plus $CrO_3$ formed by spray drying a silica hydrogel having about 0.1 weight percent alumina containing an aqueous solution of $CrO_3$. Essentially identical catalyst can be formed by impregnating 952 Grade silica commercially available from Davison Chemical Company with an aqueous solution of $CrO_3$ and drying at about 200°–400° F., (129°–204° C.) in air. In this and subsequent examples this is referred to as Ti-free silica. All of the titanium-free silica used in this and the subsequent examples was made in this manner except for runs 13–15 of this example, the preparation of which runs 13–15 is described hereinafter.

An experimental silica-chromium acetate catalyst was prepared in the manner described for the cogel except that titanium was absent. The preparation of such a large pore silica is described in Witt, U.S. Pat. No. 3,900,457 Aug. 19, 1975). This gives a large pore silica which inherently gives higher melt index polymer. Samples of it were activated according to this invention.

Each of the activated catalysts was tested in ethylene polymerization as described in Example 1. All melt index values are adjusted to a productivity level of 5000 g polyethylene per g catalyst.

In each series of catalysts, the invention catalysts according to embodiment 2 are compared with conventionally activated catalysts (controls, runs 1, 7, 13) and with invention catalysts activated according to embodiment 1 on the basis of polymer melt index, etc. The results demonstrate that catalysts consisting of chromium oxide supported on silica or on coprecipitated silica-titania and activated according to this invention are substantially improved in melt index capability compared with otherwise identical catalysts conventionally activated in air. Comparing invention runs 2 and 5, it is seen that catalyst activated according to embodiment 2 additionally improves melt index capability compared to embodiment 1, i.e. 14.7 MI for run 2 vs. 19.9 for run 5. The benefits of preoxidizing and self-reducing the catalyst before treating in CO, etc. followed by reoxidation compared to omitting the preoxidation step are clearly seen. Inspection of invention runs 3–6 points out another facet of this invention. That is, the duration of CO treatment influences the melt index capability. Thus, other conditions being equal, the catalyst of run 3, for example, gives a polymer of 10 MI while the catalyst of run 6 gives a polymer of 22 MI. Runs 11 and 12 illustrate yet another facet of this invention. That is, other conditions being equal, the preoxidation temperature employed also affects melt index capability of the catalysts. For this particular catalyst, a preoxidation temperature of 649° C. gives somewhat better results than a preoxidation temperature of 538° C. The results illustrate the relatively complex interrelationships present in practicing this invention.

EXAMPLE 3

Another series of catalysts activated according to embodiment 2 of this invention was prepared from the cogel catalyst previously described.

Each of the catalysts was tested in ethylene polymerization as described in Example 1.

The catalyst activation conditions employed and polymerization results obtained are shown in Table 3. The melt index values are adjusted to a productivity level of 5000 g polyethylene per g catalyst.

presented in Table 4. Runs were carried out to yields of approximately 5000 g polymer per g catalyst. The melt index values are adjusted to a productivity level of 5000 g polymer per g catalyst.

Table 4

Ethylene/1-Olefin Copolymerization With Catalyst Activated By Preoxidation, Reduction and Reoxidation

| Run No. | Temperature Rise Air to | Temperature Rise $N_2$ to | Activation CO °C./Hrs. | Activation Air °C./Hrs. | Comonomer Olefin | Comonomer Vol. % | Run Temp. (°C.) | MI (g/10 min) | HLMI/MI | Density (g/cc) | Run Time (Min) | Productivity (g/g catalyst) | Remarks |
|---|---|---|---|---|---|---|---|---|---|---|---|---|---|
| 1 | 650° C. | 871° C. | 871/65 | 760/2 | 0 | na[1] | 110 | 22.8 | 39.3 | 0.969 | 65 | 5180 | invention, homopolymer |
| 2 | 650° C. | 871° C. | 871/65 | 760/2 | hexene-1 | 0.9 | 107 | 28.2 | 37.2 | 0.961 | 53 | 4700 | invention, copolymer |
| 3 | 650° C. | 871° C. | 871/65 | 760/2 | hexene-1 | 1.6 | 105 | 28.4 | 31.9 | 0.959 | 61 | 4320 | invention, copolymer |
| 4 | 650° C. | 871° C. | 871/65 | 760/2 | butene-1 | 1.9 | 103 | 16.3 | 35.7 | 0.950 | 66 | 4940 | invention, copolymer |

Notes:
[1] Not applicable.

The results show that catalysts activated according to the invention are active for ethylene/1-olefin copolymerization and that efficient incorporation of the comonomer was achieved. The copolymers have relatively narrow molecular weight distributions characteristic of the activated catalysts of this invention.

Table 3

Cogel Catalyst Activation Via Preoxidation, Treating Agent and Reoxidation

| Run No. | Air Temp. Rise to | Self-Reduction Ambient at 871° C. | Gaseous Treatment at 87° C. | Activation In Air °C./hrs. | MI (g/10 min) | HLMI/MI | Run Time (Min) | Productivity (g/g catalyst) | Remarks |
|---|---|---|---|---|---|---|---|---|---|
| 1 | 871° C. | | na[1] | 871/3 | 5.2 | 37.9 | 58 | 4970 | conventional activation, control |
| 2 | 871° C. | $N_2$ | $\frac{20}{80}\frac{CH_4}{N_2}$ (15 min), $N_2$ (3 hrs.) | 650/2 | 14.6 | 37.8 | 48 | 3690 | invention (embodiment 2)[2] |
| 3 | 650° C. | $N_2$ | benzene vapor/$N_2$ (30 min); $\frac{20}{80}\frac{air}{N_2}$ (1¼ hrs);[4] $N_2$ (1 hr) | 705/2 | 8.5 | 40.4 | 60 | 5540 | invention (embodiment 2)[3] |

Notes:
[1] Not applicable.
[2] Volume % methane/$N_2$.
[3] $N_2$ saturated with benzene vapor at 23° C. at about atmospheric pressure. Air/$N_2$ mixture is given as volume percent.
[4] To burn off carbon. The benzene vapor/$N_2$; air/$N_2$; and $N_2$ are all part of the reduction step.

Inspection of the results presented in Table 3 illustrates that the melt index capability of the catalysts can be improved by preoxidizing them in air, quickly self-reducing in an inert ambient at the high end of the 600°-1100° C. range for self-reduction and treating them in ambients containing hydrocarbons which decompose to give reducing agents and reoxidizing the products in air.

EXAMPLE 4

A series of catalysts activated according to embodiment 2 of this invention was prepared from the cogel catalyst previously described.

Each catalyst was tested for copolymerization of ethylene with a small amount of a higher 1-olefin in a 2 liter stainless steel stirred reactor at an ethylene pressure of 550 psig (3.89 MPa g) in an isobutane diluent. The catalyst activation conditions employed, polymerization conditions used and polymerization results are

EXAMPLE 5

This example shows the effect of the self-reduction step both with silica titanium cogel and Ti-free silica. The cogel contained 2% titanium and 1% chromium and the Ti-free silica contained 1% chromium. As can be seen comparing runs 1 and 2, higher melt index was obtained utilizing the three step process wherein self-reduction was carried out prior to reoxidation. Run 7 shows the good results obtained with a titanium-free support utilizing the sequence air, nitrogen, CO prior to reoxidation, although runs 5 and 6 demonstrate improved melt index in accordance with the invention wherein a titanium-free support is subjected to reducing conditions prior to reoxidation since at this reactor temperature, Ti-free silica would give only about a 1.0 melt index without the use of the invention. The results are shown hereinbelow in Table 5.

Table 5

Effect of Preoxidation Step

Cogels A and B contained 2% Ti and 1% Cr. Reactor conditions were 110° C. and 550 psig ethylene in isobutane. MI values have been correcred to 5000 gm./gm.

| Run | Catalyst | Rise | Activation CO - 3 Hrs | Air - 2 Hrs | MI (g/10 Min) | HLMI/MI | Run Time (Min) | Productivity (gm/gm) |
|---|---|---|---|---|---|---|---|---|
| 1 | Cogel A | CO to 871° C. | 871° C. | 760° C. | 14.7 | 37.5 | 84 | 5130 |
| 2 | Cogel A | Air to 650° C., $N_2$ to 871° C. | 871° C. | 760° C. | 19.9 | 44.0 | 65 | 4050 |
| 3 | Cogel B | $N_2$ to 900° C. | 900° C. | 760° C. | 13.9 | 31.2 | 60 | 5270 |
| 4 | Cogel B | Air to 650° C., $N_2$ to 900° C. | 900° C.$^a$ | 760° C. | 16.9 | 37.4 | 77 | 5380 |
| 5 | Ti-free silica | $N_2$ to 871° C. | 871° C. | 760° C. | 3.4 | 42.6 | 110 | 6240 |
| 6 | Ti-free silica | CO to 871° C. | 871° C. | 760° C. | 3.3 | 45.3 | 66 | 5530 |
| 7 | Ti-free silica | Air to 650° C., $N_2$ to 871° C. | 871° C. | 760° C. | 4.8 | 39.4 | 66 | 5230 |

$^a$25% CO - 75% $N_2$
Reactor Temperature 109° C.

EXAMPLE 6

This is an accumulative example further showing the advantage for embodiment 2. In this example, silica-titania cogel containing about 2% titania prepared as in Example 1 containing 1% chromium was reduced and reoxidized. The results are shown hereinbelow in Table 6.

because the percentage carbon monoxide is sufficiently low that combustion does not occur.

EXAMPLE 7

This example shows the advantage for heating the titanium-free silica in the second embodiment to the self-reduction temperature in the presence of air. In this example, a titanium-free silica containing 1% chromium

Table 6

Preoxidation Treatments

Polymerizations run in isobutane at 3.8 MPa (550 psig) ethylene at 110° C.

| Run | Rise | Activation CO Treatment CO/$N_2$ (%CO) | Time (hrs.) | Temp., ° C. | Temp. of 2-hr air Treatment,° C. | Run Temp.,° C. | Run Time (Min.) | MI[1] | HLMI/MI | Productivity (g/g) |
|---|---|---|---|---|---|---|---|---|---|---|
| 1 | 100% CO to 871° C. | 100 | 3 | 871 | 760 | 110 | 84 | 14.7 | 38 | 5130 |
| 2 | Air to 650° C.; $N_2$ to 871° C. | 100 | 3 | 871 | 760 | 110 | 65 | 19.9 | 44 | 4050 |
| 3 | $N_2$ to 900° C. | 100 | 3 | 900 | 760 | 110 | 60 | 13.9 | 31 | 5270 |
| 4 | Air to 650° C., $N_2$ to 900° C. | 100 | 3 | 900 | 760 | 110 | 77 | 16.9 | 37 | 5380 |
| 5 | 5% CO to 871° C. | 5 | 2 | 871 | 649 | 107 | 62 | 10.8 | 38 | 5000 |
| 6 | Air to 871° C. | 5 | 2 | 871 | 649 | 107 | 50 | 10.2 | 35 | 5430 |

[1]MI's are corrected to 5000 g/g productivity.

As can be seen, runs 2 and 4 utilizing embodiment 2 show higher melt index. However, the embodiment 1 runs also show a higher melt index compared with conventional activation, see Example 1, control run 1. One word of explanation is in order with respect to run 6. It is possible to go directly from air to carbon monoxide was subjected to self-reduction either by being directly heated in nitrogen to 871° C. or by being heated in air to 650° C. and thereafter in nitrogen to 871° C., thereafter reduced in carbon monoxide for 3 hours at 871° C. and subjected to a 2 hour air reoxidation at varying temperatures. Results are shown hereinbelow in Table 7.

Table 7

Reoxidation Temperature

CO treatment for 3 hours at 871° C.
Polymerization at 110° C. in isobutane, and 3.8 MPa (550 psig) ethylene.

| Run | Raised In | Two-hour Air Treatment at Temp. ° C. | Run Time (min.) | Productivity (g/g) | MI[1] (g/10 min.) | HLMI/MI |
|---|---|---|---|---|---|---|
| 1 | $N_2$ to 871° C. | 538 | 60 | 1910 | 0.1 | 73 |
| 2 | $N_2$ to 871° C. | 649 | 120 | 4100 | 3.3 | 46 |
| 3 | $N_2$ to 871° C. | 704 | 90 | 3490 | 4.8 | 37 |
| 4 | $N_2$ to 871° C. | 760 | 56 | 5150 | 3.3 | 49 |
| 5 | $N_2$ to 871° C. | 816 | 80 | 4723 | 3.0 | 39 |
| 6 | $N_2$ to 871° C. | 871 | 106 | 3900 | 1.7 | 43 |
| 7 | $N_2$ to 871° C. | 838 | 100 | 5350 | 2.3 | 59 |
| 8 | $N_2$ to 871° C. | 593 | 75 | 4960 | 3.2 | 54 |
| 9 | $N_2$ to 871° C. | 649 | 87 | 5450 | 3.0 | 52 |
| 10 | $N_2$ to 871° C. | 704 | 77 | 5350 | 2.4 | 53 |
| 11 | air to 650° C. $N_2$ to 871° C. | 649 | 155 | 5760 | 4.2 | 43 |
| 12 | air to 650° C. | | | | | |

Table 7-continued

Reoxidation Temperature
CO treatment for 3 hours at 871° C.
Polymerization at 110° C. in isobutane, and 3.8 MPa (550 psig) ethylene.

| Run | Raised In | Two-hour Air Treatment at Temp. ° C. | Run Time (min.) | Productivity (g/g) | MI[1] (g/10 min.) | HLMI/MI |
|---|---|---|---|---|---|---|
| 13 | $N_2$ to 871° C. air to 650° C. | 704 | 70 | 5660 | 6.2 | 40 |
| 14 | $N_2$ to 871° C. air to 650° C. | 760 | 66 | 5230 | 4.8 | 39 |
|  | $N_2$ to 871° C. | 871 | 50 | 4960 | 2.7 | 44 |

[1]MI corrected to 5000 g/g productivity.

As can be seen by comparison of runs 2 and 11, 3 and 12, 4 and 13, and 6 and 14, better results are obtained by carrying out the initial heating in air.

EXAMPLE 8

This example also involves the Ti-free silica containing 1% chromium. In this example, the temperature used for the self-reduction step was varied. The results are shown hereinbelow in Table 8.

Table 8

In each run after the treatment described, the catalyst was given CO treatment for 3 hours at 871° C. and air reoxidation for 2 hours at 704° C. Polymerizations were then run at 110° C. in isobutane at 3.8 MPa (550 psig) ethylene.

| Run | Raised in | Run Time (min.) | Productivity (g/g) | MI[1] (g/10 min.) | HLMI/MI |
|---|---|---|---|---|---|
| 1 | Air to 650° C. $N_2$ at 650°C. for 1½ hrs. CO to 871° C. | 90 | 5200 | 2.3 | 50 |
| 2 | Air to 650° C. $N_2$ to 760° C. $N_2$ at 760° C. for 1½ hrs. CO to 871° C. | 60 | 5040 | 2.9 | 49 |
| 3 | Air to 650° C. $N_2$ to 816° C. $N_2$ at 816° C. for 1½ hrs. CO to 871° C. | 81 | 5550 | 4.8 | 46 |
| 4 | Air to 650° C. $N_2$ to 871° C. $N_2$ at 871° C. for 1½ hrs. | 110 | 5000 | 5.3 | 44 |

[1]MI corrected to 5000 g/g productivity.

As can be seen, as the self-reduction temperature is increased from 650° C. to 871° C., the melt index is increased and the HLMI/MI ratio decreased.

EXAMPLE 9

Titanium-free silica was impregnated with titanium and subjected to CO reduction and reoxidation as in the invention. One percent chromium was present as in the invention and the catalyst used for ethylene polymerization at 225° F. (107° C.). The results are as follows:

| Run | | |
|---|---|---|
| 1 | 2% impregnated Titanium MI = 1.2 | CO to 1600° F. and held 2 hrs., air 1100° F. and held 2 hrs. HLMI/MI = 83 |
| 2 | 2% impregnated Titanium | CO to 700° C. and held 2 hrs., air 450° C. and held 15 min. (No reaction after one hour). |
| 3 | 6% impregnated Titanium MI = 65 | CO to 700° C. and held 2 hrs., air 450° C. and held 15 min. (Low activity, 2 hours 880 gm/gm). HLMI/MI = 45 CO to 1600° F. |
| 4 | 6% impregnated Titanium MI = 20 | and held 2 hrs., air 1100° F. and held 2 hrs. (Low activity, 3 hours 1650 gm/gm). HLMI/MI = 47 |

This example shows that with titanium impregnated supports, a broad molecular weight distribution polymer is achieved (45-83 HLMI/MI ratio at 107° C. reactor temperature) which is essentially useless for applications such as injection molding.

While this invention has been described in detail for the purpose of illustration, it is not to be construed as limited thereby but is intended to cover all changes and modifications within the spirit and scope thereof.

We claim:

1. A process for activating a chromium-containing catalyst prepared by coprecipitating a titanium compound and silica to form a cogel comprising a first step wherein said catalyst is contacted with a nonoxidizing ambient at a temperature of at least 600° C. and a subsequent second step where it is contacted with an oxygen-containing oxidizing ambient at a temperature within the range of 450°-1000° C.

2. A method according to claim 1 wherein prior to said first step said catalyst composition containing at least a portion of said chromium in the form of $CrO_3$ is treated at a temperature of 600°-1100° C. in an inert atmosphere for a time sufficient to achieve at least partial self-reduction of said chromium to a lower valence state and wherein said nonoxidizing ambient of said first step is a reducing agent under the conditions employed in said first step.

3. A method according to claim 2 wherein said reducing agent comprises carbon monoxide and said inert ambient is nitrogen.

4. A method according to claim 2 wherein said $CrO_3$ is obtained by heating said catalyst in the presence of oxygen prior to said self-reduction step.

5. A method according to claim 2 wherein said $CrO_3$ is obtained by introducing said chromium onto said cogel in the form of $CrO_3$ initially.

6. A method according to claim 2 wherein said cogel is heated in air to a temperature within the range of 250°-1000° C. over a time period of 20 minutes to 10 hours and thereafter said self-reduction is carried out in nitrogen at a temperature within the range of 700°-925° C. for at least 5 minutes and wherein said reduction step is carried out in an ambient comprising 2-100% carbon monoxide at a temperature of 700°-925° C. for a time within the range of ½ to 24 hours and wherein said reoxidation is carried out in air at a temperature within the range of 500°–925° C. for ½ to 10 hours.

7. A method according to claim 6 wherein said non-oxidizing ambient is 2–100% carbon monoxide and 98–0% $N_2$.

8. A method according to claim 7 wherein said chromium is present in an amount within the range of 0.1 to 5 weight percent based on the weight of said cogel and said titanium is present in an amount within the range of 0.5 to 5 weight percent based on the weight of said cogel.

9. A method according to claim 8 wherein said non-oxidizing ambient is nitrogen.

10. A method according to claim 9 wherein said cogel is formed by adding a titanium compound to a mineral acid, introducing an alkali metal silicate into the acid containing said titanium compound to form a hydrogel, aging the hydrogel for a time of greater than one hour, washing the thus aged hydrogel to produce a substantially alkali metal free hydrogel, forming a mixture comprising the thus washed hydrogel and a normally liquid oxygen-containing water soluble organic compound, and separating said organic compound and water from said mixture to form a xerogel.

11. A method according to claim 10 wherein said chromium is added as an aqueous solution of a chromium compound to said hydrogel.

12. A method according to claim 1 wherein said contact with said non-oxidizing ambient and said contact with said oxidizing ambient is carried out in a continuous activator.

13. A method according to claim 1 wherein said contact with said oxygen-containing ambient is carried out at a temperature at least 100° C. below the temperature of which said contact with said nonoxidizing ambient is carried out.

14. A catalyst produced by the method of claim 11.

15. A catalyst produced by the method of claim 1.

16. A process for producing a catalyst active for olefin polymerization comprising subjecting a titanium-free silica composition containing chromium wherein at least a portion of said chromium is in the form of $CrO_3$ to an inert ambient for a time and at a temperature sufficient to self-reduce at least a portion of said $CrO_3$ to a lower valence state, and thereafter subjecting the thus self-reduced composition to a reducing ambient at a temperature sufficient to further reduce at least a portion of said chromium, and thereafter reoxidizing the thus reduced composition.

17. A method according to claim 16 wherein said self-reduction is carried out in a nitrogen ambient and said further reduction is carried out in an ambient comprising carbon monoxide and said reoxidation is carried out in air.

18. A method according to claim 16 wherein said $CrO_3$ is obtained by initially impregnating the titanium-free silica with $CrO_3$.

19. A method according to claim 17 wherein said $CrO_3$ is obtained by heating said silica composition to said self-reduction temperature in the presence of air.

20. A catalyst produced by the method of claim 19.

21. A catalyst produced by the method of claim 16.

22. A method of producing a catalyst active for olefin polymerization comprising subjecting a titanium-free silica composition containing chromium at least a portion of which is in the form of $CrO_3$ to an inert ambient at a temperature within the range of 600°–1100° C. for a time of at least 5 minutes, and thereafter contacting the resulting composition with a reducing ambient at a temperature within the range of 650°–1100° C. for a time of at least 5 minutes, and thereafter contacting the thus reduced composition with an oxygen-containing ambient at a temperature within the range of 450°–1000° C.

23. A method according to claim 22 wherein said inert ambient is nitrogen, said reducing ambient is 2–100% carbon monoxide, and said oxygen-containing ambient is air.

24. A method according to claim 22 wherein said $CrO_3$ is obtained by incorporating said chromium onto said silica base as $CrO_3$ initially.

25. A method according to claim 22 wherein said $CrO_3$ is obtained by heating said catalyst to said temperature of 600°–1100° C. in the presence of oxygen.

26. A method according to claim 22 wherein said heating to said temperature of 600°–1100° C. is carried out in the presence of air.

27. A method according to claim 22 wherein said chromium is present in an amount within the range of 0.1 to 10 weight percent based on the weight of said silica composition.

28. A method according to claim 22 wherein said chromium is present in an amount within the range of 0.1 to 5 weight percent based on the weight of said silica composition.

29. A method according to claim 22 wherein said oxygen-containing ambient for said reoxidation is air.

30. A method according to claim 22 wherein said subjecting to an inert atmosphere and said contacting with a reducing ambient and said contacting with an oxygen-containing ambient are all carried out in a continuous activator.

31. A method according to claim 22 wherein said contact with said oxygen-containing ambient is carried out at a temperature at least 100° C. below the temperature at which said contact with said reducing ambient is carried out.

* * * * *